United States Patent Office 3,267,120
Patented August 16, 1966

3,267,120
17,17'-METHYLENEBIS ETHERS OF 3-LOWER ALKOXY ESTRA-1,3,5(10)-TRIENE
Gerhard R. Wendt, Havertown, and Kurt W. Ledig, Philadelphia, Pa., assignors to American Home Products Corporation, New York, N.Y., a corporation of Delaware
No Drawing. Filed May 26, 1964, Ser. No. 370,361
3 Claims. (Cl. 260—397.5)

This invention relates to a novel cholesterol shifting steroidal derivative which may be represented by the formula:

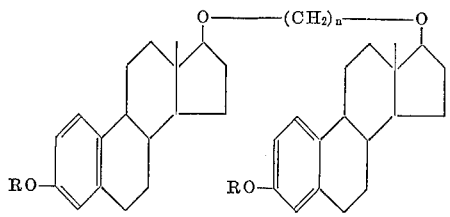

wherein R represents a lower alkyl group of up to about 7 carbon atoms such as methyl, ethyl, propyl, butyl, etc. and n represents a positive integer from 1 to about 3 giving rise to such lower alkylene groups as methylene, ethylene and propylene and the like.

The compound which comprises the preferred product embodiment of our invention is a high melting, white crystalline solid, somewhat soluble in organic solvents and insoluble in water. It possesses steroidal activity in general and mild estrogenic and anti-lipaemic acitvity in particular. Thus the compound could be adapted for use by admixture with suitable diluents and carriers for subsequent administration in those cases where steroidal therapy is indicated for estrogenic deficiency.

The compound illustrated above can thus be formulated and administered to mammals in a wide variety of dosage forms singly or in admixture with other active compounds. Thus it may also be admixed and administered in combination with a large number of compatible diluents, carriers and the like to form a pharmaceutical composition. Where injectibles are to be prepared add well known liquid carriers as water, mineral or vegetable oil or a nontoxic lower aliphatic alcohol. Solid excipients, binders, extenders and carriers such as carboxymethylcellulose, starches, sugars and the like may be added where tablets or powders are to be prapered. The dosage of the compounds will vary with the severity of the conditions treated but in general can vary from 0.05 to 10 mg./kilo of body weight per day depending upon the many factors of the case involved.

The following embodiment is exemplary of our preferred mode of practice of our invention but is not to be construed as limitative thereof. The degrees expressed are on the centigrade scale.

*d-17,17'-methylenedioxybis[3-methoxyestra-1,3,5(10)-triene]*

A suspension of 5.0 g. of estradiol 3-methyl ether, 100 ml. of xylene, and 3.9 g. of sodium hydride (50% in oil) was refluxed for two hours. The reaction mixture was cooled to room temperature and after the addition of 15 ml. of chloromethyl methyl ether refluxing was continued for five hours. Water was added and the reaction mixture extracted with a sodium bicarbonate solution, and brine to obtain a gum which was chromatographed over alumina (neutral, grade I). Elution with ether followed by crystallization from methanol-benzene gave 1.5 g. of the desired product; M.P. 196–197°; (found: C, 80.33; H, 8.82). $C_{39}H_{52}O_4$ requires: C, 80.09; H, 8.96%.

In a manner similar to the above preparation the compounds d-17,17'-methylenedioxybis[3-propoxyestra-1,3,5-(10)-triene] or d-17,17'-methylenedioxybis[3-ethoxyestra-1,3,5(10)-triene] may be prepared by substitution of the respective starting compounds estradiol 3-propyl ether and estradiol 3-ethyl ether for the estradiol 3-methyl ether employed therein.

What is claimed is:
1. A compound of the formula:

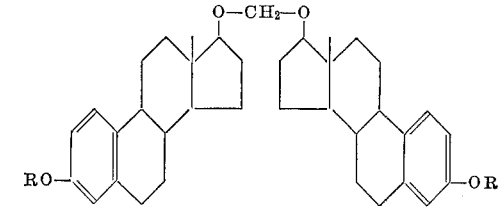

wherein R represents a lower alkyl group.

2. d17,17'-methylenedioxybis[3 - methoxyestra - 1,3,5-(10)-triene].

3. A method for the preparation of compounds of the formula:

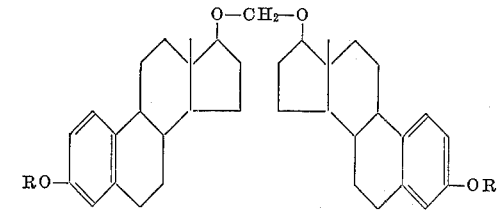

wherein R represents a lower alkyl group, which comprises refluxing a reaction mixture of sodium hydride and a steroid of the formula:

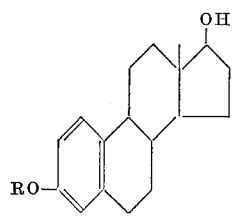

wherein R is defined as above, with a quantity of chloromethyl methyl ether and recovering after reflux the product of said reaction.

No references cited.

LEWIS GOTTS, *Primary Examiner.*
ELBERT L. ROBERTS, *Examiner.*